Patented Sept. 15, 1925.

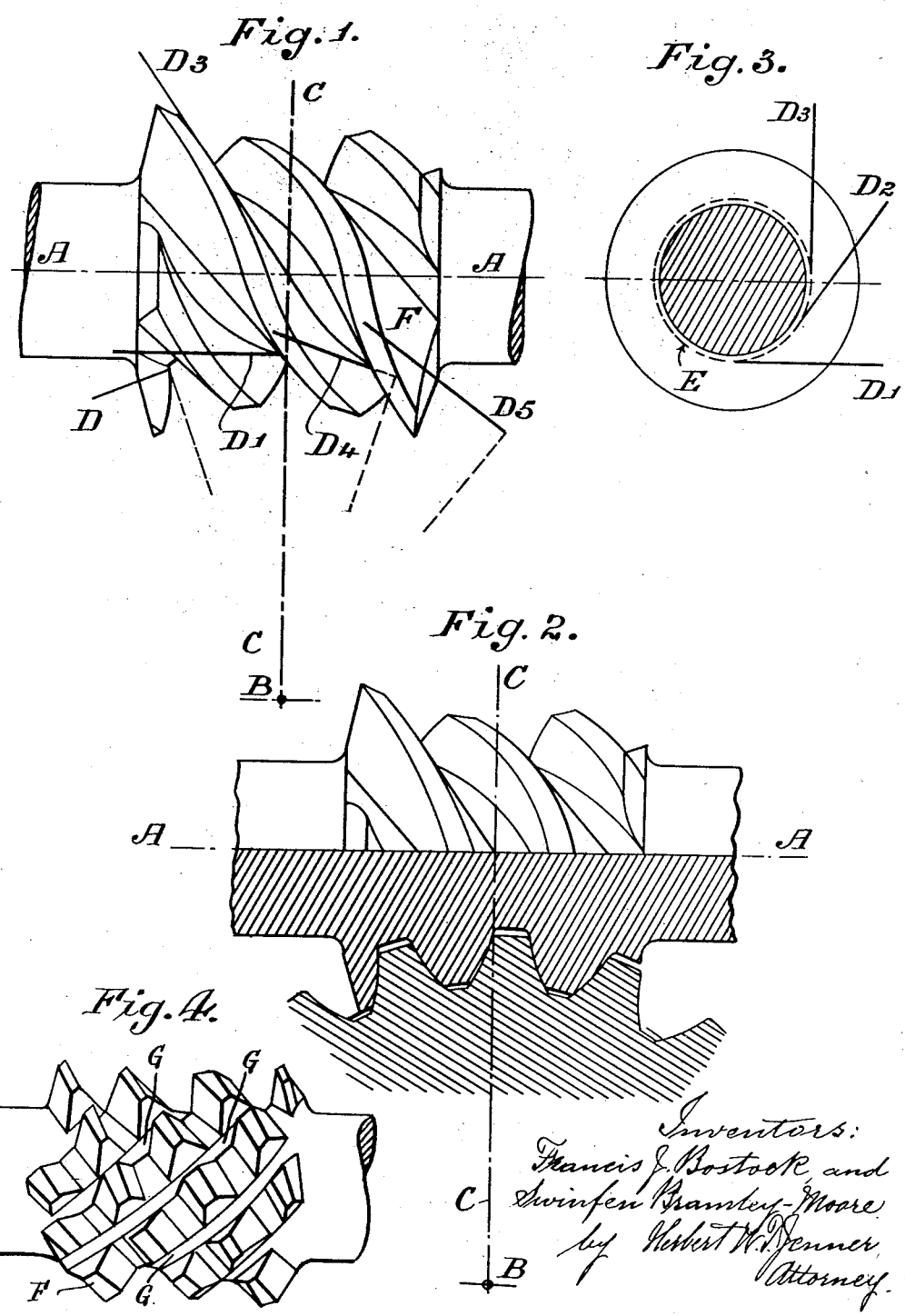

1,553,666

UNITED STATES PATENT OFFICE.

FRANCIS JOHN BOSTOCK AND SWINFEN BRAMLEY-MOORE, OF HUDDERSFIELD, ENGLAND.

WORM GEARING.

Application filed November 5, 1923. Serial No. 672,736.

*To all whom it may concern:*

Be it known that we, FRANCIS JOHN BOSTOCK and SWINFEN BRAMLEY-MOORE, subjects of King George V of Great Britain, residing at Netherton, Huddersfield, in the county of York, England, have invented a new and useful Improvement in or Relating to Worm Gearing, of which the following is a specification.

This invention relates to the hour-glass, globoidal or Hindley type of worm gear and comprises an improved construction or formation of the thread or threads of the worm or the shape thereof and that of its conjugate worm wheel, and has for its object the removal or reduction of interference met with between worm and wheel in the ordinary globoidal type of gear, and the obtaining of a more perfect contact between the thread of the worm and the teeth of the worm wheel, these closely conforming to each other, together with an increased load carrying capacity between the two gears.

In the drawings, Fig. 1 is an elevation of a worm constructed according to and embodying our invention.

Fig. 2 is a similar elevation of the worm partly in section and of a portion of a worm wheel in mesh therewith, the latter being in section taken midway across the width of the teeth.

Fig. 3 is an end elevation of the worm.

Fig. 4 is an elevation of a worm according to the invention arranged as a cutting tool for generating the teeth of conjugate worm wheels.

According to our invention we arrange for the threads of our globoidal worm to be generated by a straight line in the manner now to be described.

In or near to a central plane CC containing the worm wheel axis B and at right angles to the worm axis A we select a circle E representing the diameter of the worm at the base of the thread at or near the smaller diametered portion of the worm or a smaller or larger diameter as the case may be, and we arrange for straight lines such as $D^1$, $D^2$ or $D^3$ to originate from this circle E contained in said plane, these straight lines lying at a predetermined angle to lines parallel to the axis of the worm and tangential to a cylinder of the same diameter as the circle E and containing the circle E. Said circle E and cylinder are concentric and coaxial with one another and with the worm, and the inner ends of the lines $D^1$, $D^2$ and $D^3$ terminate in said circle. One side of our globoidal worm thread F is generated by swinging, in a circular path, at a predetermined speed, any suitable one of these lines about a given centre, such as the centre or axis B of the worm wheel, the line passing through progressive positions such as D, $D^1$, $D^4$ and $D^5$, at the same time causing the worm to rotate about its axis at a relative predetermined speed. The movements of the generating line and worm are therefore coordinated about the axes A and B which are spaced apart and at an angle to one another. Said generating line, when in one position, coincides with one of the lines $D^1$, $D^2$ or $D^3$ ($D^1$ as shown), so that said generating line when in said position terminates at its inner end in the circle E, with said line tangential to the cylinder as previously described. It will, of course, be understood that the line chosen must lie on that side of the worm adjacent to the given centre. In a similar manner the opposite side of the thread may be generated by selecting a similar tangential straight line but pointing in the opposite direction, and by swinging this line in a circular path about the given centre in the same manner as that previously described.

If equal ratio gears be used it is obvious that either may be regarded as the worm or the worm wheel and our invention may therefore be used for the generation of either member.

In worm gearing the smaller member is usually regarded as the worm, but it is immaterial for the purpose and application of our invention whether the smaller or larger member be regarded as the worm provided that our system of generation is applied to one of the members in the manner hereinbefore described.

A worm made according to our invention may as shewn in Fig. 4 have a number of longitudinal gashes G cut through its threads for the purpose of providing cutting faces, after which the sides of the threads may be relieved, so as to enable the worm to be used as a cutting tool for generating the teeth of conjugate worm wheels. This generation of conjugate worm wheels, made according to our invention, can be carried out on worm wheel generating machines in common use.

Having thus described our invention,— what we claim as new and desire to secure by Letters Patent is:—

1. A globoidal worm, one side of the thread of which is formed or provided with a working surface generated by the coordinated rotation of the worm about its axis and the swinging of a straight line about another axis, the inner end of said line, when in one position, terminating in a circle of a predetermined diameter coaxial with the worm axis and located in a plane at or near the smaller diametered portion of the worm, said line when in said position being tangential to a cylinder coaxial with and containing said circle, and said line when in said position lying at a predetermined angle to the axis of the worm.

2. A globoidal worm, one side of the thread of which is formed or provided with a working surface generated by the coordinated rotation of the worm about its axis and the swinging of a straight line about the worm wheel axis, the inner end of said line, when in one position, terminating in a circle coaxial with the worm axis and located in a plane at or near the smaller diametered portion of the worm, said circle being of the diameter the same or nearly the same as that of the base of the thread of the worm in said plane, said line when in said position being tangential to a cylinder coaxial with and containing said circle, and said line when in said position lying at a predetermined angle to the axis of the worm.

In testimony whereof we affix our signatures.

FRANCIS JOHN BOSTOCK.
SWINFEN BRAMLEY-MOORE.